United States Patent

[11] 3,566,079

[72] Inventor Michael J. O'Neill
West Redding, Conn.
[21] Appl. No. 766,775
[22] Filed Oct. 11, 1968
[45] Patented Feb. 23, 1971
[73] Assignee The Perkin-Elmer Corporation
Norwalk, Conn.

[54] TEMPERATURE LINEARIZATION CIRCUIT
10 Claims, 3 Drawing Figs.
[52] U.S. Cl. .................................................. 219/505,
219/494, 219/501
[51] Int. Cl. .................................................. H05b 1/02
[50] Field of Search .......................................... 219/499,
504; 338/22, 23; 219/505, 501, 494

[56] References Cited
UNITED STATES PATENTS
3,316,765  5/1967  Trolander et al. ............  338/22
OTHER REFERENCES
Electronic Industries, A. B. Soble, " Thermistors For Linear Temperature Readings," Nov. 1968

*Primary Examiner*—Bernard A. Gilheany
*Assistant Examiner*—F. E. Bell
*Attorney*—Edward R. Hyde, Jr.

ABSTRACT: A temperature-programming arrangement includes a source of voltage $V_o$ having a magnitude which varies over a period of time in accordance with a predetermined temperature program, and, a resistance thermometer positioned adjacent a sample to be temperature programmed. Circuit means are provided for applying a portion of the voltage $V_o$ to said resistance thermometer for causing a linearizing component of current to flow therein.

PATENTED FEB 23 1971

3,566,079

INVENTOR.
Michael J. O'Neill
BY
Frank J. Thompson
ATTORNEY.

TEMPERATURE LINEARIZATION CIRCUIT

This invention relates to apparatus adapted for varying the temperature of a substance in an accurately controlled manner over a range of temperatures. The invention relates more particularly to an improved means for providing an accurate indication of the temperature of the substance during temperature programming.

In various apparatus it is desirable to vary the temperature of a substance in a controlled manner over a range of temperatures. For example, some analytical instruments are adapted for varying the temperature of a sample substance in a programmed manner in order to detect temperature-related changes occurring in the physical characteristics of the substance. A known arrangement includes circuit means for providing a setpoint voltage $V_{sp}$ which is varied in amplitude over a period of time and which is representative of temperatures in the programmed range, and, a temperature-sensing circuit means for providing a voltage $V_t$ representative of the sample temperature. Differences in amplitude between these voltages are automatically detected and an exchange of thermal energy with the substance is effected in a manner for reducing the voltage difference and corresponding temperature difference. The sample temperature is thereby caused to vary in accordance with the desired programmed temperature.

In one temperature-programming arrangement, the sample substance is positioned within a furnace in an enclosed chamber and thermal energy is applied to the furnace or removed from the furnace in accordance with the predetermined temperature program. The temperature of the sample substance is detected by a resistance thermometer such as a resistance coil which is closely thermally coupled to the furnace. Circuit means cause a current to flow in the resistance and a voltage drop $V_t$ is thereby established across the coil. The resistance of the coil varies with temperature and the voltage $V_t$ is thus proportional to the resistance and the temperature of the sample.

Meaningful data and accurate control of heat exchange with the sample can only be achieved when the voltage $V_t$ is an accurate representation of the temperature of the sample during temperature programming. Although the referred-to temperature-sensing arrangement provides useful accuracy, various physical requirements necessitate the spacing apart of the sample substance and the sensing coil and as a result temperature gradients exist between the sample substance and the sensing coil. These gradients create an undesirable, nonlinear relationship between the indicated sample temperature and the true sample temperature which becomes particularly pronounced at temperatures differing substantially from ambient temperature. The accuracy of temperature sensing and programming is thereby less than desirable.

Accordingly, it is an object of this invention to provide an improved temperature programming arrangement.

Another object of the invention is to provide an improved temperature indicating means in a temperature programming arrangement having a resistive thermometer spaced apart from a substance which is being temperature programmed.

A further object of the invention is to reduce nonlinearities occurring in an indicated temperature vs. true temperature characteristic of a resistive thermometer which is remotely spaced from a substance being temperature programmed.

In accordance with the general features of the present invention, in a temperature programming arrangement including a source of program voltage $V_o$ having a magnitude which varies over a period of time in accordance with a predetermined temperature program and a resistance thermometer positioned adjacent to a sample which is temperature programmed, a circuit means is provided for applying a portion of the program voltage $V_o$ to said resistance thermometer for causing a linearizing component of current to flow therein.

In accordance with more particular features of the present invention, the temperature programming arrangement includes means for exchanging thermal energy with a substance being temperature programmed when deviations between an indicated temperature $T_i$ of the substance and a setpoint temperature $T_{sp}$ exist. The resistance thermometer comprises a resistive sensor positioned near the substance and having a substantially linearly varying resistance-temperature characteristic. Circuit means cause an exciting current to flow in the resistive sensor thereby providing an output voltage $V_t$ indicative of substance temperature. Circuit means provide a program voltage $V_o$ having an amplitude varying in time in accordance with a predetermined temperature program and apply a portion of the voltage $V_o$ to the resistive sensor in a manner for causing a linearizing current component to flow in the resistive sensor. The indicated temperature $T_i$ is thereby rendered substantially linear over a range of temperatures.

These and other objects and features of the present invention will become apparent with reference to the following specifications and drawings wherein.

Figure 1:
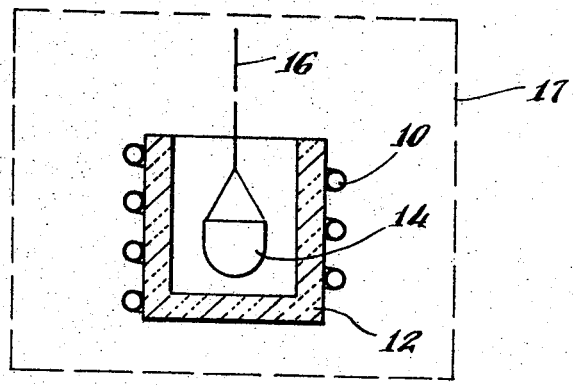
FIG. 1 is a diagram illustrating a sample container positioned in a furnace.

Referring now to FIG. 1, a heater element 10 formed of a resistive heater material such as platinum wire is shown wound in helical form about an outer surface of a furnace 12. The furnace which is illustrated in sectional form is generally cylindrically shaped and fabricated of a refractory material such as aluminum oxide. A sample container 14 is provided for supporting a sample in the furnace. The sample container comprises, for example, a pan supported by any conventional means. For example, a wire 16 suspends the container from a balance arm of a thermal gravimetric apparatus. A sample under analysis is deposited in the container and since the heater element 10 is positioned with respect to the sample under analysis, the sample will be heated to desired temperatures. This furnace assembly is positioned in an enclosed environment represented symbolically by the dashed-line rectangle 17. Conventional cooling means, not shown, for temperature programming the sample to subambient temperatures is also provided.

Figure 2:
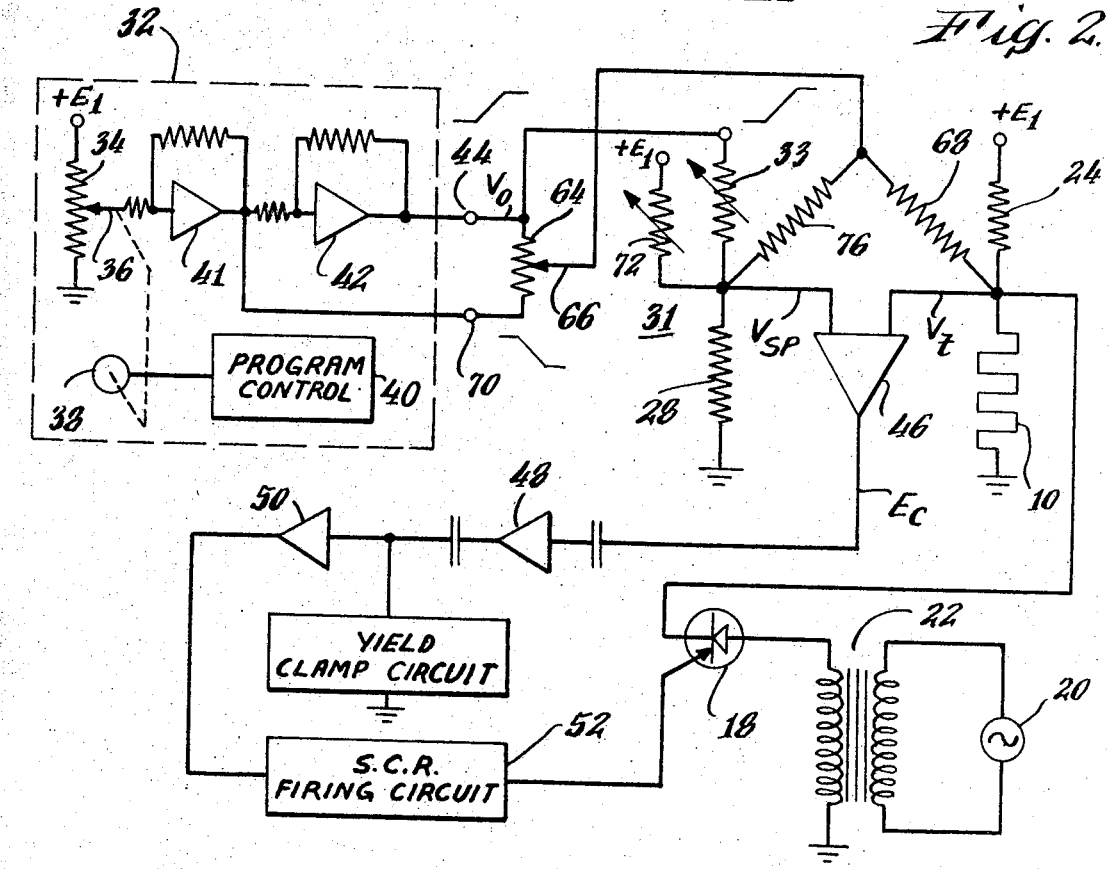
FIG. 2 is a circuit diagram illustrating a temperature-indicating arrangement constructed in accordance with features of the present invention; and, FIG. 3 is a diagram of temperature differential $\Delta T$ vs. true temperature which is helpful in explaining the features of the present invention.

A circuit arrangement for periodically energizing the heater element 10 and for sensing and controlling the temperature of the sample during above ambient temperature programming is illustrated in FIG. 2. Electrical heating energy is applied to the heating element 10 during one portion of a heating-sensing cycle while temperature sensing is performed during another portion of the cycle. This arrangement is described and claimed in my copending patent application Ser. No. 673,040, filed Oct. 5, 1967, and which is assigned to the assignee of this invention. The heating element 10 is shown coupled to a silicon-controlled rectifier 18. Electrical energy for heating the element is derived from an alternating current source 20 and is coupled to the heating element via a transformer 22 and the silicon-controlled rectifier 18. The element 10 is also series coupled with a resistive impedance 24 and a source of DC potential $+E_1$. A DC sensing current flows in this series circuit and establishes a voltage drop $V_t$ across the element 10. This voltage varies in amplitude in accordance with the resistance of the element 10. As the heater element increases in temperature, its resistance increases accordingly. Since a platinum heater element exhibits a substantially linear resistance-temperature characteristic, the voltage $V_t$ will be relatively linearly related to the temperature of the element 10. However, as indicated hereinafter, the spacing of the element 10 from the sample results in temperature gradients creating nonlinear deviations between indicated temperature and true temperature of the sample.

The desired setpoint temperature $T_{sp}$ to which the sample is to be heated is represented by a voltage drop $V_{sp}$ (Fig. 2) established across a resistive impedance 28 of a voltage divider 31. This setpoint voltage is derived from circuit means 32 which provides an output program voltage $V_o$ which is applied to a resistance 33 of the voltage divider 31. The program voltage $V_o$ comprises a varying DC voltage which varies slowly in amplitude in a predetermined manner, over a period of time. The circuit means 32 includes a potentiometer 34 across which a potential $+E_1$ is applied. A sliding contact arm 36 of the potentiometer is mechanically driven by a motor 38. The motor is energized by a program control means 40 which is adapted for causing the motor to drive the arm 36 at a predetermined rate. A voltage slowly varying in amplitude is thereby provided at the arm 36. This voltage is amplified by cascade coupled operational amplifiers 41 and 42. The output voltage $V_o$ is provided by the amplifier 42 at a terminal 44 and is applied to the voltage divider 31 as indicated.

Circuit means for generating an alternating voltage $E_c$ having an amplitude proportional to a difference in the amplitudes of the voltages $V_{sp}$ and $V_t$ includes a chopper 46 of the electromechanical or electronic type. This alternating voltage is amplified by an amplifier stage 48 and is coupled via a DC amplifier 50 to an S.C.R. control circuit 52. Heating power is applied to the element 10 in accordance with the amplitude of the AC signal. The S.C.R. firing control circuit 52 effects an amplitude to phase conversion for controlling the conduction of the S.C.R. and the application of heater energy. As the temperature of the element 10 approaches the setpoint temperature $T_{sp}$, the voltage $V_t$ approaches $V_{sp}$ in amplitude and the signal $E_c$ decreases in amplitude toward zero volts. The feedback loop then provides for the automatic application of power to the element 10 for maintaining the setpoint temperature $T_{sp}$.

Figure 3:
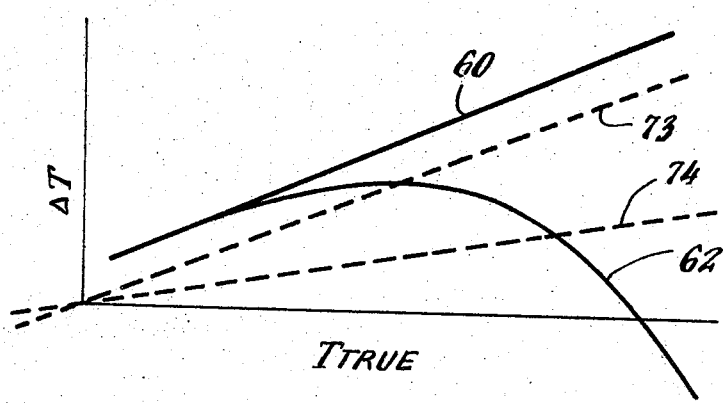

Spacing of the sensing element 10 from the sample positioned in the container 14 results in temperature gradients which are determined by the physical configuration of the particular furnace container and heater assembly. In general, the voltage output of a resistance thermometer with constant current excitation may be expressed in the form:

$$V(T) = I_o R_o (1 + \alpha \Delta t + \beta \Delta T^2 + \gamma \Delta T3 + \ldots)$$

where $\Delta T$ represents the difference between indicated temperature $T_i$ and ambient temperature $T_a$;
$R_o$ is the resistance when $\Delta T = 0$, and
$\alpha$ 62 and 65 are coefficients determined by the ambient temperature and the resistance material of thermometer 10, and the thermal coupling between the sample and the sensing element.
This relationship may also be used to represent the voltage output of a resistive temperature sensing element with relatively constant current excitation and when the element is spaced apart from the sample when the coefficients of this expression are suitably modified. FIG. 3 illustrates the relationships between true temperature of the sample and $\Delta T$. It is desirable that $\Delta T$ vary linearly over the range of temperatures with respect to true temperature, as represented by the curve 60 of FIG. 3. However, because of the second order, third order and higher order components in the above expression for the voltage output of the resistance thermometer, the relationship is not linear and varies undesirably as illustrated by the curve 62.

In accordance with a feature of this invention, a portion of the program voltage $V_o$ is applied to the sensing element 10 and causes a linearizing current to flow in element 10. In FIG. 2, this voltage is shown to be derived from a potentiometer 64 and is applied via an adjustable wiper arm 66 and a resistive impedance 68 to the junction of the resistance thermometer 10 and the impedance 24. A voltage ($-V_o$) differing in phase with $V_o$ is derived from the amplifier 41 and is coupled to a terminal 70. The wiper arm 66 may then be manually adjusted to provide negative or positive voltages of selectable amplitude for application to the resistor 10. Sensing element with positive $\beta$ such as nickel and a negative $\beta$ such as platinum and copper may therefore be compensated. A current, proportional to $V_o$ flows in the resistor 10 for linearizing the characteristic 62 of FIG. 3.

Adjustable resistances 72 and 33 are shown coupled to resistance 28. The linearized characteristic 60 is then adjusted by variation of the resistances 72 and 33 to extend through the origin of the coordinates, as illustrated by curve 73.

A portion of the voltage $V_o$ is also applied to the voltage divider 31 by a resistive impedance 76. A current is applied via this impedance to the junction of the resistances 28 and 33 in order to make the shape of curve 73 independent of the linearity adjustment provided by the current through 68 into the heater. The indicated temperature represented by the voltage $V_t$ at the junction of the resistors 10 and 24 is thereby compensated for temperature gradients resulting from the remote spacing of the temperature sensing 10 from the sample of container 14.

The operation of the above-described linearizing circuit can be explained with reference to the following mathematical expression:

$$V(T) = I_o R_0 [1 + (\alpha + B) \Delta T + (\beta + \alpha) \Delta T^2 + (\gamma + \beta) \Delta T^3 + \ldots]$$

where $B$ is a coefficient relating the current through resistance 68 to the program voltage $V_o$; $\alpha$, $\beta$, $\gamma$ and $\Delta T$ having been defined hereinbefore. The slider 66 is adjusted to minimize the second and higher order turns. Impedance 76 is chosen to compensate for the reaction of this adjustment on the first order term.

An improved temperature sensing arrangement employing a resistive thermometer has been described which advantageously employs the linearity of indicated temperature for a thermometer spaced remotely with respect to a sample which is being temperature programmed.

While I have illustrated and described a particular embodiment of my invention, it will be understood that various modifications may be made therein without departing from the spirit of the invention and the scope of the appended claims.

I claim:

1. An apparatus for varying the temperature of a substance over a range of temperatures in a predetermined manner said apparatus having a resistive temperature-sensing element positioned adjacent the substance, means coupled to said element for causing a sensing current to flow in said element for generating a voltage $V_t$ indicative of sample temperature, voltage source means for providing a voltage $V_o$ having an amplitude which is representative of temperature in the programmed range and which varies in a predetermined manner over the temperature range, and a means for increasing the linearity of the voltage indication $V_t$ comprising a circuit means coupling a portion of said voltage $V_o$ from said source to said resistive element for causing a linearizing current to flow in said element.

2. The apparatus of claim 1 wherein said temperature-sensing element is positioned adjacent to and spaced apart from the sample substance.

3. The apparatus of claim 2 wherein said means for providing a voltage $V_o$ is adapted for providing a varying voltage $V_o$ of positive or negative polarity.

4. The apparatus of claim 3 wherein said means for causing a sensing current to flow in said element includes a source of electrical potential and an electrical impedance coupled in a series circuit arrangement with said element and said circuit means couples a portion of said voltage $V_o$ to a junction of said electrical impedance and said sensing element.

5. The apparatus of claim 4 wherein said circuit means for providing the voltage $V_o$ provides a second phase differing voltage $-V_o$, a voltage divider having means for deriving a portion of the voltage applied across said divider, and means for applying said voltages $V_o$ and $-V_o$ to said voltage divider.

6. The apparatus of claim 2 including voltage dividing impedance means having an output terminal, and said circuit means couples said voltage $V_o$ to said voltage divider, and circuit means for applying a portion of said voltage $V_o$ to said output terminal.

7. The apparatus of claim 6 including impedance means coupled to said terminal for altering the characteristic of the indicated temperature vs. true temperature of the sensing element.

8. In an analytical instrument for temperature programming a substance over a range of preselected temperatures, said instrument including thermal transfer means for altering the temperature of a sample, a resistive temperature-sensing element positioned near said sample for sensing the temperature of said sample, circuit means including a source of DC potential and a resistive impedance coupled in series with said sensing means for causing a sensing current to flow in said element and establishing a voltage $V_t$ indicative of the temperature of said sample, circuit means for providing a voltage $V_o$ having an amplitude which is representative of temperatures in the programmed range and which varies in a predetermined manner over the programmed range, voltage dividing means for providing at an output terminal thereof a voltage $V_{sp}$ representing a desired setpoint temperature, means for applying said program voltage $V_o$ to said voltage divider, circuit means for detecting a variation in amplitude between the voltages $V_t$ and $V_{sp}$ and for causing an exchange of thermal energy with said element in a manner for equilibrating said voltages, and circuit means including a resistive impedance for coupling a portion of the voltage $V_o$ to said sensing element.

9. The apparatus of claim 8 including a resistive impedance for coupling a portion of the voltage $V_o$ to the output terminal of said voltage divider.

10. The apparatus of claim 1 wherein said resistive temperature sensing element comprises a resistance coil.